US007164903B1

(12) United States Patent
Cliff et al.

(10) Patent No.: US 7,164,903 B1
(45) Date of Patent: Jan. 16, 2007

(54) INTEGRATED N-WAY WILKINSON POWER DIVIDER/COMBINER

(75) Inventors: Richard Cliff, Melbourne, FL (US); Michael J. Kettner, Palm City, FL (US); Robert J. Wright, Tequesta, FL (US); Andrew J. Kettner, Stuart, FL (US); Patrick A. Biebersmith, Hobe Sound, FL (US); Juan G. Ayala, Hobe Sound, FL (US)

(73) Assignee: Smiths Interconnect Microwave Components, Inc., Stuart, FL (US)

( * ) Notice: Subject to any disclaimer, the term of this patent is extended or adjusted under 35 U.S.C. 154(b) by 510 days.

(21) Appl. No.: 10/458,074

(22) Filed: Jun. 10, 2003

(51) Int. Cl.
*H04B 1/26* (2006.01)

(52) U.S. Cl. ...................... 455/327; 455/137; 455/270; 333/116; 333/128

(58) Field of Classification Search ................ 455/133, 455/137, 270, 273, 292, 313, 323, 327, 330, 455/333, 334; 333/116, 120, 124, 128
See application file for complete search history.

(56) References Cited

U.S. PATENT DOCUMENTS 3,760,283 A 9/1973 Lockwood
3,825,933 A 7/1974 Debski et al.
4,412,183 A 10/1983 Brodie
4,809,356 A * 2/1989 Peckham et al. ............ 455/86
4,912,394 A 3/1990 Sugimoto et al.
5,021,755 A * 6/1991 Gustafson .................. 333/128
5,408,205 A 4/1995 Blacka
5,789,996 A * 8/1998 Borodulin .................. 333/117
5,939,939 A * 8/1999 Gaynor et al. .......... 330/124 R
5,986,516 A 11/1999 Mazzochette
6,023,209 A 2/2000 Faulkner et al.
6,441,698 B1 8/2002 Matsutani et al.
6,542,048 B1 * 4/2003 Sherman et al. ............ 333/128

* cited by examiner

*Primary Examiner*—Edward F. Urban
*Assistant Examiner*—Thuan T. Nguyen
(74) *Attorney, Agent, or Firm*—Morgan, Lewis & Bockius LLP

(57) ABSTRACT

An integrated N-way Wilkinson power divider is described. In one embodiment, the N-way Wilkinson power divider uses a conductor layer with a cross-over (or cross-under) resistor insulated from the conducting layer by an insulating bridge. In one embodiment, the width of the transmission line underneath a cross-over resistor is adjusted to improve performance In one embodiment, a three-way Wilkinson power divider is formed using microstrip transmission lines on a single-layer substrate that supports the microstrip transmission lines, dielectric insulators, and resistors.

31 Claims, 4 Drawing Sheets

INTEGRATED N-WAY WILKINSON POWER DIVIDER/COMBINER

BACKGROUND

1. Field of the Invention

The invention relates to N-way Wilkinson power dividers for splitting or combining power in a radio frequency circuit.

2. Description of the Related Art

A Wilkinson power divider is a passive electronic device that splits a single RF input signal into two (n=2) or more (n≧3) in-phase output RF signals. Such devices can also be used in the opposite direction to combine multiple in-phase RF signals into a single RF output. The details of design and operation for these devices are well known. Such devices are typically realized using resistors and impedance-transformer sections of RF transmission line (such as coaxial line, microstrip, stripline, etc.) in various configurations.

In many applications, especially for high-volume and low-cost component production, it is desirable to construct Wilkinson power dividers using inexpensive assembly methods and materials such as sputtered, printed or etched circuits on a flat substrate and using planar transmission lines (e.g. microstrip, stripline, etc.). Realizing n-way (where n≧3) Wilkinson power dividers is difficult and expensive, requiring the use of circuits assembled from multiple substrate layers and/or the use of discrete resistors rather than printed or etched resistors. These costs and difficulties have limited the usefulness of N-way Wilkinson power dividers.

SUMMARY

The present invention solves these and other problems by providing integrated Wilkinson power dividers on a single substrate layer, resulting in substantially-reduced manufacturing cost. In one embodiment, an n-way (where n≧3) Wilkinson power divider is fabricated on a single substrate layer which supports transmission-line sections and resistors, including one or more output transmission-line conductors that cross one or more resistors. The cross-over (or cross-under) resistors are supported by the substrate layer and are insulated from the transmission-line conductors by a relatively thin local dielectric insulator formed by printing, etching etc. In one embodiment, the width of at least one transmission line section is adjusted where it passes under a resistor in order to improve electrical performance of the device.

In one embodiment, a three-way Wilkinson power divider is constructed as an integrated-type circuit on a substrate, such as, for example, alumina, Teflon, plastic, etc. Integrated microstrip transmission-line structures are formed on the substrate using conductive inks and printing techniques. Integrated resistors are formed on the substrate using resistive ink and printing techniques, and an integrated insulating area between a transmission-line conductor and a resistor is formed using printing-type techniques.

DETAILED DESCRIPTION

Although typically referred to as a power divider, a Wilkinson power divider can also be used as a combiner to combine multiple input RF signals into a single RF output. Accordingly, the present disclosure refers to a Wilkinson power divider with the understanding that the term power divider also encompasses a power combiner.

Figure 1:
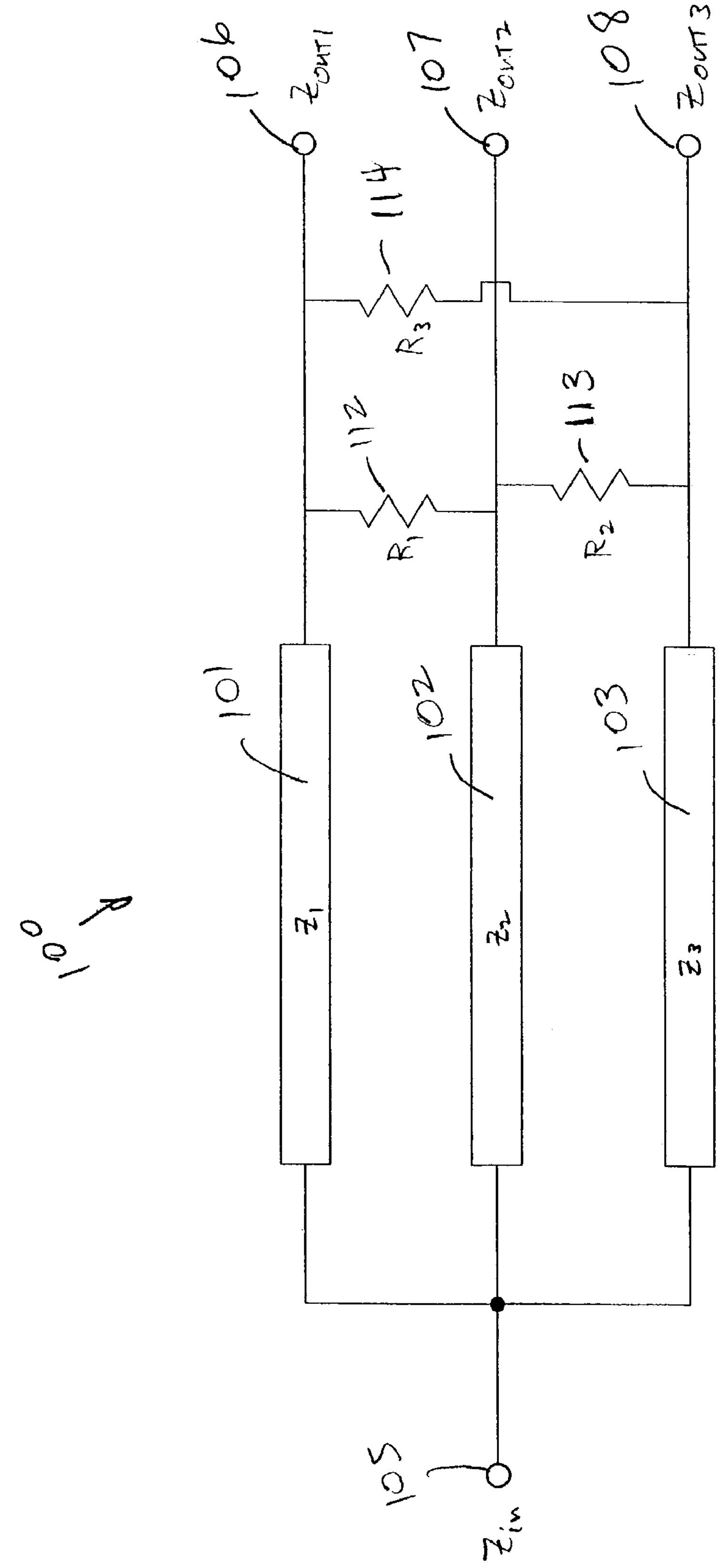
FIG. 1 is a schematic diagram of a three-way Wilkinson power divider.

FIG. 1 is a schematic diagram of a three-way (n=3) Wilkinson power divider 100. The power divider 100 includes an input 105 having a driving-point impedance $Z_{in}$, and three outputs 106–108, having respective driving point impedances $Z_{out1}$, $Z_{out2}$ and $Z_{out3}$. Three impedance-transformer transmission lines 101–103 having respective transmission-line characteristic impedances $Z_1$, $Z_2$ and $Z_3$ are provided between the input 105 and the outputs 106–108, respectively. Three resistors 112–114 (having resistance $R_1$, $R_2$ and $R_3$, respectively) are provided between outputs 106 and 107, 107 and 108, and 108 and 106 respectively.

The three impedance-transformer transmission lines 101–103 are typically each one-quarter wavelength long at some desired frequency $f_o$. The impedances of the impedance-transformer transmission lines 101–103 and the values of the resistors 112–114 are calculated using established formulas that depend on the input impedance $Z_{in}$, the output impedances $Z_{out1}$, $Z_{out2}$ and $Z_{out3}$ and the desired power split between the outputs 106–108. In one embodiment, when the impedances $Z_{in}$, $Z_{out1}$, $Z_{out2}$, and $Z_{out3}$ are all equal, and an equal power split is desired, then $Z_1=Z_2=Z_3=\sqrt{3}Z_{in}$ and $R_1=R_2=R_3=3Z_{in}$.

Until now, a three-way Wilkinson power divider has been relatively expensive to manufacture due to the need for at least one of the transmission lines, such as the transmission line 102 in FIG. 1, to cross over or under a resistor, such as the resistor 114. To satisfy this requirement, it has been necessary to use one or more extra layers of substrate material and/or to use some non-integrated components such as discrete resistors.

Figure 2:
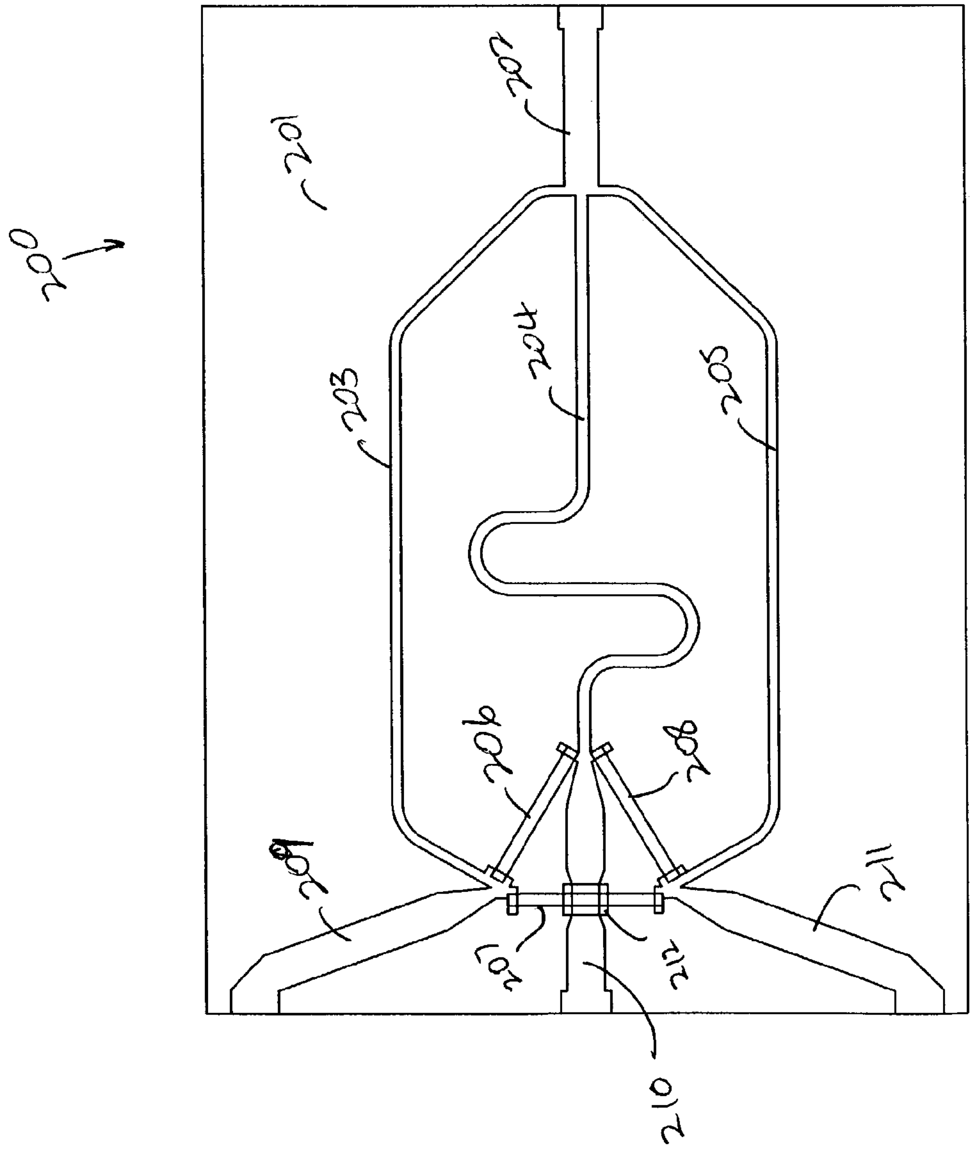
FIG. 2 shows an implementation of the three-way Wilkinson power divider where a resistor crosses an output transmission line.

FIG. 2 shows an implementation of the three-way Wilkinson power divider 200 on a grounded dielectric substrate 201. The Wilkinson power divider 200 has an input transmission line 202 that is provided to a first end of each of three impedance-transformer transmission lines 203–205. A second end of the impedance-transformer transmission line 203 is provided to an output transmission line 209. A second end of the impedance-transformer transmission line 204 is provided to an output transmission line 210. A second end of the impedance-transformer transmission line 205 is provided to an output transmission line 211. A first terminal of a resistor 206 is provided to the junction between the impedance-transformer transmission line 203 and the output transmission line 209. A second terminal of the resistor 206 is provided to the junction between the impedance-transformer transmission line 204 and the output transmission line 210. A first terminal of a resistor 207 is provided to the junction between the impedance-transformer transmission line 203 and the output transmission line 209. A second terminal of the resistor 207 is provided to the junction between the impedance-transformer transmission line 205 and the output transmission line 211. A first terminal of a resistor 208 is provided to the junction between the impedance-transformer transmission line 204 and the output transmission line 210. A second terminal of the resistor 208 is provided to the junction between the impedance-transformer transmission line 205 and the output transmission line 211. In one embodiment, the impedance-transformer transmission lines 203–205 are all substantially the same length. In one embodiment, the impedance-transformer transmission line 204 includes one or more curved sections to adjust the length of the impedance-transformer transmission line 204 to substantially match the length of the impedance-transformer transmission lines 203 and 205.

The resistor 207 crosses the output transmission line 210 at a crossing region. The resistor 207 is insulated from the output transmission line 210 by a dielectric insulator 212 provided between the resistor 207 and the output transmission line 210 in the crossing region. In one embodiment, the resistor 207 crosses over the output transmission line 210. In one embodiment, the resistor 207 crosses under the output transmission line 210. The dielectric insulator 212 can be any dielectric insulator, such as, for example, glass, plastic, air, epoxy, polymeric materials, elastomers, etc. In one embodiment, the dielectric insulator 212 is formed using Metech 7600 material. The presence of the dielectric insulator 212 and/or the resistor 207 near the output transmission line 210 will perturb the transmission line impedance of the output transmission line 210 and also cause some coupling between the output transmission line 210 and the resistor 207. In one embodiment, the width of the output transmission 212 is adjusted (increased and/or decreased) to improve performance of the power divider 200. In one embodiment, performance is improved by reducing the transmission line width in the crossing region and thereby providing more nearly uniform transmission-line characteristic impedance through the crossing region. In one embodiment, operation is improved by reduction of capacitive RF signal coupling with the resistor 210 due to the reduction in overlapping area.

The transmission lines 202–205 and 209–211 and the resistors 206–208 are disposed on the grounded dielectric substrate 201. In one embodiment, the dielectric substrate 201 comprises materials with relatively low loss at RF, such as, for example, alumina, Teflon, plastic, etc. The transmission lines 202–205 and 209–211 can be formed by etching (e.g., photo etching) processes and/or by depositing (e.g., by photo masking, printing, etc.) conductive materials such as, for example, metals and/or conductive inks. In one embodiment, a conductive ink such as, for example, Metech 3524 is used. The resistors 206–208 can be formed by etching (e.g., photo etching) processes and/or by depositing resistive materials such as, for example, metals and/or resistive inks. In one embodiment, a resistive ink such as, for example, Metech 9000 series thick-film material is used.

Figure 3:
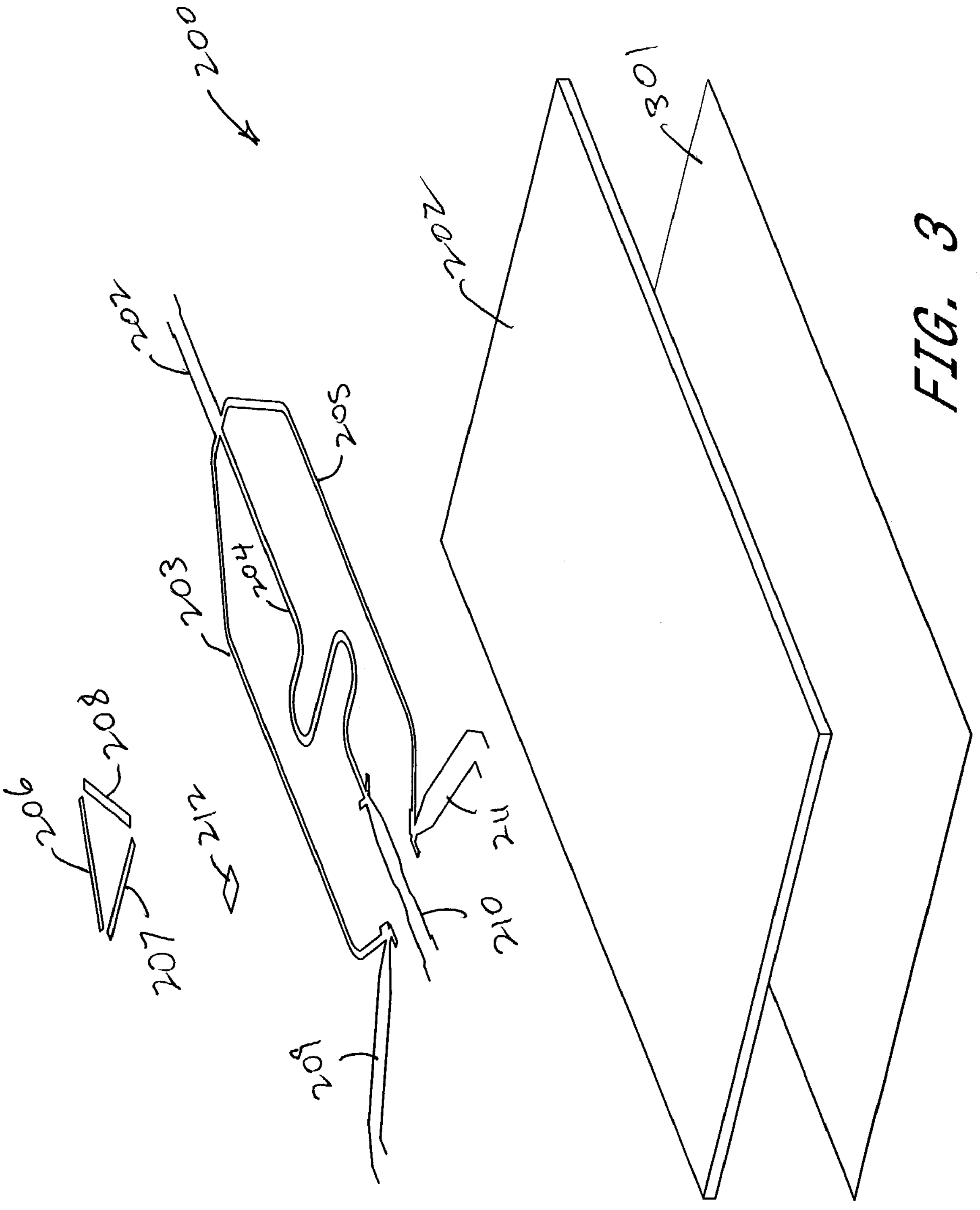
FIG. 3 shows an exploded view of the three-way Wilkinson power divider shown in FIG. 2.

FIG. 3 shows an exploded view of the three-way Wilkinson power divider 200 shown in FIG. 2. In FIG. 3, the resistor 207 is shown as passing over the output transmission line 210. As discussed above, the resistor 207 can also pass under the output transmission line 210. FIG. 3 also shows a ground plane 301 for the grounded dielectric substrate 201.

Figure 4:
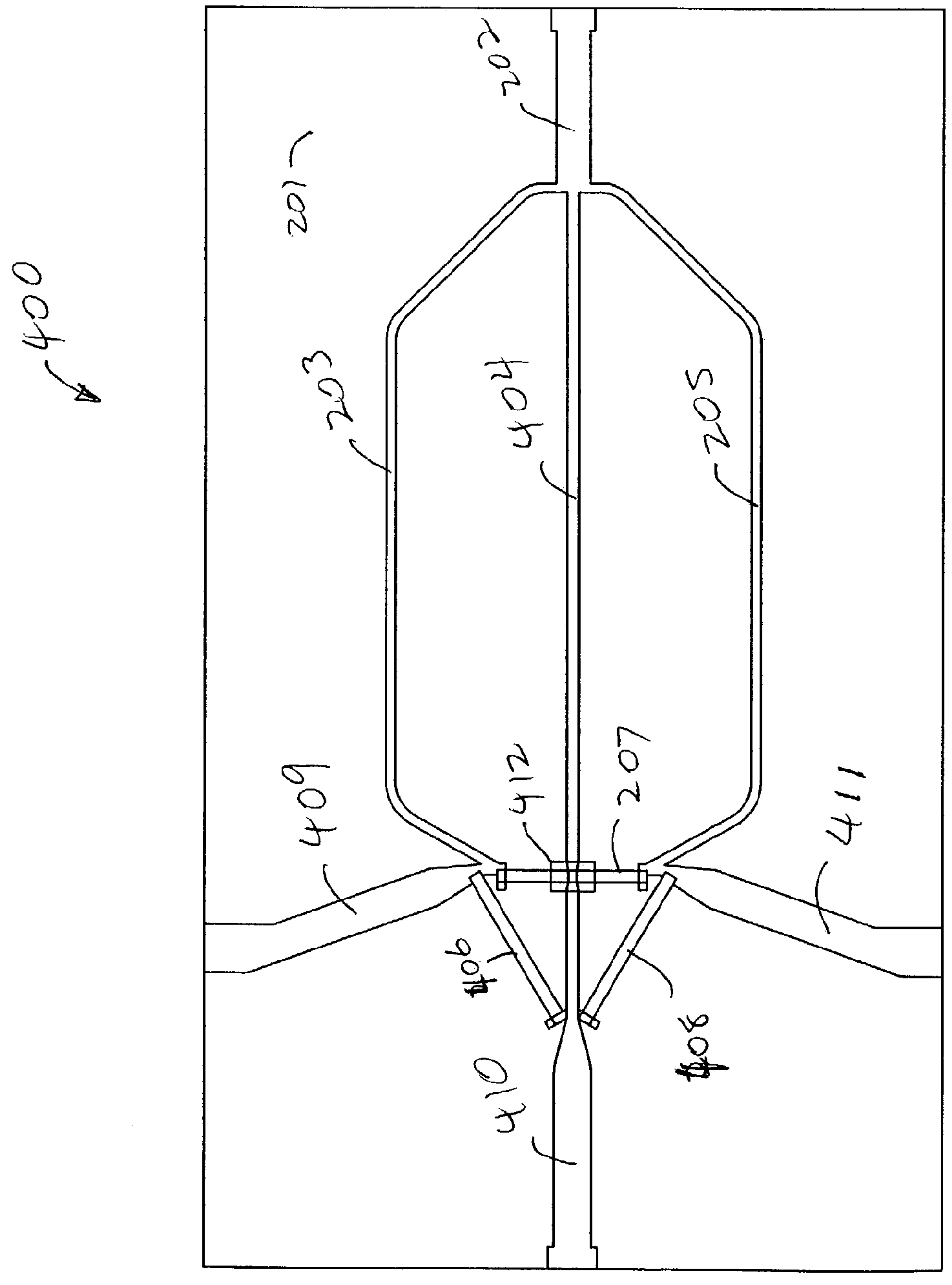
FIG. 4 shows an implementation of the three-way Wilkinson power divider where a resistor crosses a impedance-transformer transmission line.

In the three-way Wilkinson power divider 200, the resistor 207 crosses the output transmission line 210. FIG. 4 shows a three-way Wilkinson power divider 400, where the resistor 207 crosses a impedance-transformer transmission line 404. The power divider 400 includes the grounded substrate 201 and the transmission lines 202, 203, and 205 as configured in FIG. 2, and the resistor 207 as configured in FIG. 2. The second end of the impedance-transformer transmission line 203 is provided to an output transmission line 409. The second end of the impedance-transformer transmission line 205 is provided to an output transmission line 411. In the power divider 400, the impedance-transformer transmission line 204 is replaced by a straightened impedance-transformer transmission line 404 which crosses the resistor 207 and is provided to an output transmission line 410. The impedance-transformer transmission line 404 is insulated from the resistor 207 by a dielectric insulator 412.

In the power divider 400, a first terminal of a resistor 406 is provided to the junction between the impedance-transformer transmission line 203 and an output transmission line 409. A second terminal of the resistor 406 is provided to the junction between the impedance-transformer transmission line 404 and the output transmission line 410. A first terminal of a resistor 408 is provided to the junction between the impedance-transformer transmission line 404 and the output transmission line 410. A second terminal of the resistor 408 is provided to the junction between the impedance-transformer transmission line 205 and the output transmission line 411. In one embodiment, the impedance-transformer transmission lines 203, 205, and 404 are all substantially the same length. In one embodiment, the width of the impedance-transformer transmission line 404 is reduced in the crossing region to compensate for impedance variations caused by the dielectric insulator 412 and/or the resistor 207. The dielectric insulator 414 is similar to the dielectric insulator 212 and can be constructed from the same types of materials.

Although described above in connection with a particular embodiment of the present invention, it should be understood the description of the embodiment is illustrative of the invention and are not intended to be limiting. Thus, for example, although the specific examples provided here were for a single-stage 3-way Wilkinson power dividers, it should understood that the principle of allowing resistors to cross transmission lines by using dielectric insulators can be used to construct N-way Wilkinson power dividers where N>2 having one or more stages. Moreover, the N-way Wilkinson power dividers can be constructed such that resistors cross resistors by using dielectric insulators. Moreover, the practice of integrating resistor—resistor, resistor-transmission line, and/or transmission line-transmission line crossing by using dielectric insulators and adjusted line widths in the crossing regions as described above can be used to construct other RF circuits involving combinations of resistors and/or transmission lines. The adjustment in line width can be an adjustment of a width of a transmission line and/or an adjustment of a width of a resistor line. One of ordinary skill in the art will recognize that a change in a width of a resistor line will change a resistance of the resistor and such change can be compensated by changing a length of the resistor line and/or changing a width of the resistor line outside the crossing region. Accordingly, various modifications and applications may occur to those skilled in the art without departing from the true spirit and scope of the invention as defined in the appended claims.

What is claimed is:

1. A three-way Wilkinson power divider/combiner comprising:

a first microstrip transmission line on a grounded substrate, a first end of said first microstrip transmission line provided to an input transmission line, a second end of said first microstrip transmission line provided to a first output transmission line;

a second microstrip transmission line on said grounded substrate, a first end of said second microstrip transmission line provided to an input transmission line, a second end of said second microstrip transmission line provided to a second output transmission line;

a third microstrip transmission line on said grounded substrate, a first end of said third microstrip transmission line provided to an input transmission line, a second end of said third microstrip transmission line provided to a third output transmission line, said second transmission line disposed between said first transmission line and said third transmission line;

an insulator disposed on at least a portion of said second output transmission line;

a first resistor disposed on said substrate and provided between said second end of said first microstrip transmission line and said second end of said second microstrip transmission line;

a second resistor provided between said second end of said first impedance-transformer transmission line and said second end of said third impedance-transformer transmission line, said second resistor passing over at least a portion of said insulator; and a third resistor disposed on said substrate and provided between said second end of said second transmission line and said second end of said third transmission line.

2. The three-way Wilkinson power divider/combiner of claim 1, wherein at least a portion of said second resistor is disposed on at least a portion of said insulator.

3. The three-way Wilkinson power divider/combiner of claim 1, wherein a width of said second output transmission line is reduced where said second output transmission line passes under said insulator.

4. The three-way Wilkinson power divider/combiner of claim 1, wherein a width of said second output transmission line is reduced where said second output transmission line passes under said insulator in order to reduce impedance variations along said second output transmission line.

5. A three-way Wilkinson power divider/combiner comprising:

a first impedance-transformer transmission line on a grounded substrate, a first end of said first impedance-transformer transmission line provided to an input transmission line, a second end of said first impedance-transformer transmission line provided to a first output transmission line;

a second impedance-transformer transmission line on said grounded substrate, a first end of said second impedance-transformer transmission line provided to an input transmission line, a second end of said second impedance-transformer transmission line provided to a second output transmission line;

a third impedance-transformer transmission line on said grounded substrate, a first end of said third impedance-transformer transmission line provided to an input transmission line, a second end of said third impedance-transformer transmission line provided to a third output transmission line, said second transmission line disposed between said first transmission line and said third transmission line;

a first resistor disposed on said substrate and provided between said second end of said first impedance-transformer transmission line and said second end of said second impedance-transformer transmission line;

a second resistor provided between said second end of said first impedance-transformer transmission line and said second end of said third impedance-transformer transmission line, said second resistor crossing at least a portion of said second output transmission line in a crossover region and insulated from said second transmission line by an insulator; and a third resistor disposed on said substrate and provided between said second end of said second impedance-transformer transmission line and said second end of said third impedance-transformer transmission line.

6. The three-way Wilkinson power divider/combiner of claim 5, wherein a width of said second output transmission line is reduced in said crossover region.

7. The three-way Wilkinson power divider/combiner of claim 5, wherein a width of said second output transmission line is reduced in said crossover region to reduce reflections on said second output transmission line.

8. The three-way Wilkinson power divider/combiner of claim 5, wherein said second resistor passes over said second output transmission line.

9. The three-way Wilkinson power divider/combiner of claim 5, wherein said second resistor passes under said second output transmission line.

10. The three-way Wilkinson power divider/combiner of claim 5, wherein a width of said second impedance-transformer transmission line is reduced in said crossover region.

11. The three-way Wilkinson power divider/combiner of claim 5, wherein a width of said second impedance-transformer transmission line is reduced in said crossover region to maintain a relatively uniform impedance on said second impedance-transformer transmission line.

12. The three-way Wilkinson power divider/combiner of claim 5, wherein said second resistor passes over said second impedance-transformer transmission line.

13. The three-way Wilkinson power divider/combiner of claim 5, wherein said second resistor passes under said second impedance-transformer transmission line.

14. A three-way Wilkinson power divider/combiner comprising:

a first impedance-transformer transmission line on a grounded substrate, a first end of said first impedance-transformer transmission line provided to an input transmission line, a second end of said first impedance-transformer transmission line provided to a first output transmission line;

a second impedance-transformer transmission line on said grounded substrate, a first end of said second impedance-transformer transmission line provided to an input transmission line, a second end of said second impedance-transformer transmission line provided to a second output transmission line;

a third impedance-transformer transmission line on said grounded substrate, a first end of said third impedance-transformer transmission line provided to an input transmission line, a second end of said third impedance-transformer transmission line provided to a third output transmission line, said second transmission line disposed between said first transmission line and said third transmission line;

a first resistor disposed on said substrate and provided between said second end of said first transmission line and said second end of said second transmission line;

a second resistor provided between said second end of said first impedance-transformer transmission line and said second end of said third impedance-transformer transmission line, said second resistor crossing at least a portion of said second impedance-transformer transmission line in a crossover region and insulated from said second impedance-transformer transmission line by an insulator; and a third resistor disposed on said substrate and provided between said second end of said second transmission line and said second end of said third transmission line.

15. A method for constructing an N-way Wilkinson power divider, comprising:

forming a plurality of transmission lines on a substrate, said transmission lines including an input transmission line, N output transmission lines, and N impedance-transformer transmission lines, a first end of each of said N impedance-transformer transmission lines provided to said input transmission line, a second end of each of said N impedance-transformer transmission lines provided respectively to one of said output transmission lines such that each second end of said N transmission lines is provided to a different output transmission line;

forming one or more dielectric insulators; and forming a plurality of resistors on said substrate, one or more of said resistors crossing one or more of said transmission lines at crossing regions, said one or more of said resistors insulated from said one or more of said transmission lines at said crossing regions by said one or more dielectric insulators such that said plurality of transmission lines and said plurality of resistors cooperate to form an N-way Wilkinson power divider.

16. The method of claim 15, where N is equal to 3.

17. The method of claim 15, wherein a width of said transmission lines is reduced at said crossing regions to maintain a relatively uniform transmission line impedance.

18. The method of claim 15, wherein said plurality of resistors comprises a first resistor, said first resistor passing under at least one of said transmission lines at one of said crossing regions.

19. The method of claim 15, wherein said plurality of resistors comprises a first resistor, said first resistor passing over at least one of said transmission lines at one of said crossing regions.

20. The method of claim 15, wherein said plurality of resistors comprises a first resistor, said first resistor crossing at least one of said output transmission lines at one of said crossing regions.

21. The method of claim 15, wherein said plurality of resistors comprises a first resistor, said first resistor crossing at least one of said impedance-transformer transmission lines at one of said crossing regions.

22. The method of claim 15, wherein said forming a plurality of transmission lines on a substrate comprises etching.

23. The method of claim 15, wherein said forming a plurality of transmission lines on a substrate comprises depositing conducting ink.

24. The method of claim 15, wherein said forming a plurality of resistors depositing resistive ink.

25. An apparatus, comprising:

an input transmission line on a grounded substrate;

N output transmission lines on said grounded substrate, a first end of each of said N impedance-transformer transmission lines provided to said input transmission line;

N impedance-transformer transmission lines on said grounded substrate, a second end of each of said N impedance-transformer transmission lines provided respectively to one of said output transmission lines such that each second end of said N transmission lines is provided to a different output transmission line;

one or more dielectric insulators; and a plurality of resistors on said substrate, one or more of said resistors crossing one or more of said transmission lines at crossing regions, said one or more of said resistors insulated from said one or more of said transmission lines at said crossing regions by said one or more dielectric insulators such that said plurality of transmission lines and said plurality of resistors cooperate to form an N-way Wilkinson power divider.

26. The apparatus of claim 25, where N is equal to 3.

27. The apparatus of claim 25, wherein a width of said transmission lines is reduced at said crossing regions to maintain a relatively uniform transmission line impedance.

28. The apparatus of claim 25, wherein said plurality of resistors comprises a first resistor, said first resistor passing under at least one of said transmission lines at one of said crossing regions.

29. The apparatus of claim 25, wherein said plurality of resistors comprises a first resistor, said first resistor passing over at least one of said transmission lines at one of said crossing regions.

30. The apparatus of claim 25, wherein said plurality of resistors comprises a first resistor, said first resistor crossing at least one of said output transmission lines at one of said crossing regions.

31. The apparatus of claim 25, wherein said plurality of resistors comprises a first resistor, said first resistor crossing at least one of said impedance-transformer transmission lines at one of said crossing regions.

* * * * *